(12) United States Patent
Kwon et al.

(10) Patent No.: US 12,417,060 B2
(45) Date of Patent: Sep. 16, 2025

(54) ELECTRONIC DEVICE COMPRISING TRANSPARENT DISPLAY, AND CONTROL METHOD THEREFOR

(71) Applicant: Samsung Electronics Co., Ltd., Suwon-si (KR)

(72) Inventors: Jihye Kwon, Suwon-si (KR); Taeho Wang, Suwon-si (KR); Soonchun Joung, Suwon-si (KR); Heeyoung Chung, Suwon-si (KR); Jaehyung Kim, Suwon-si (KR); Kwanhee Lee, Suwon-si (KR); Jihye Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/305,057

(22) Filed: Apr. 21, 2023

(65) Prior Publication Data

US 2023/0266935 A1 Aug. 24, 2023

Related U.S. Application Data

(63) Continuation of application No. PCT/KR2021/019056, filed on Dec. 15, 2021.

(30) Foreign Application Priority Data

Feb. 5, 2021 (KR) .......................... 10-2021-0016532

(51) Int. Cl.
*G06F 3/14* (2006.01)
*G06F 21/84* (2013.01)

(52) U.S. Cl.
CPC ................ *G06F 3/14* (2013.01); *G06F 21/84* (2013.01)

(58) Field of Classification Search
CPC .......... G06F 21/82; G06F 21/62; G06F 21/84; G06F 3/14; G06F 3/147;
(Continued)

(56) References Cited

U.S. PATENT DOCUMENTS

2006/0221067 A1* 10/2006 Kim .................... G09G 5/00
345/204
2011/0163986 A1 7/2011 Lee et al.
(Continued)

FOREIGN PATENT DOCUMENTS

KR 10-2011-0081040 A 7/2011
KR 10-2014-0124981 10/2014
(Continued)

OTHER PUBLICATIONS

International Search Report dated Mar. 22, 2022, issued in International Patent Application No. PCT/KR2021/019056.

*Primary Examiner* — Theodore C Parsons
(74) *Attorney, Agent, or Firm* — Jefferson IP Law, LLP

(57) ABSTRACT

An electronic device is provided. The electronic device includes a transparent display capable of displaying content on a front surface part and a rear surface part, and at least one processor operatively connected to the transparent display, wherein the at least one processor can be configured to identify the position and size of content, for which security is required, in a screen image displayed on the front surface part, identify the color and/or the brightness of an object corresponding to the content, and display the object having the identified color and brightness on a region of the rear surface part determined based on the position and the size of the content.

20 Claims, 15 Drawing Sheets

(58) Field of Classification Search
CPC ... G09G 2320/0686; G09G 2340/0464; G09G 2358/00; G09G 5/10
See application file for complete search history.

(56) References Cited

U.S. PATENT DOCUMENTS

| | | |
|---|---|---|
| 2014/0313218 A1 | 10/2014 | Lee et al. |
| 2015/0062175 A1 | 3/2015 | Kim |
| 2015/0205451 A1 | 7/2015 | Lee |
| 2015/0220299 A1* | 8/2015 | Kim ............... G06F 3/1446 345/1.3 |
| 2016/0275270 A1* | 9/2016 | Bostick ............ G06F 16/35 |
| 2017/0060512 A1 | 3/2017 | Rakshit |
| 2017/0139496 A1 | 5/2017 | Kang et al. |
| 2018/0033171 A1 | 2/2018 | Rakshit |
| 2018/0129461 A1 | 5/2018 | Kim-Whitty |
| 2018/0252931 A1 | 9/2018 | Kim-Whitty |
| 2018/0267766 A1 | 9/2018 | Min et al. |

FOREIGN PATENT DOCUMENTS

| | | |
|---|---|---|
| KR | 10-2015-0026565 A | 3/2015 |
| KR | 10-2015-0088084 A | 7/2015 |
| KR | 10-2016-0086125 A | 7/2016 |
| KR | 10-2017-0056841 | 5/2017 |
| KR | 10-2018-0071810 A | 6/2018 |

* cited by examiner

Short distance of 5cm or less measured

ELECTRONIC DEVICE COMPRISING TRANSPARENT DISPLAY, AND CONTROL METHOD THEREFOR

CROSS-REFERENCE TO RELATED APPLICATION(S)

This application is a continuation application, claiming priority under § 365(c), of an International application No. PCT/KR2021/019056, filed on Dec. 15, 2021, which is based on and claims the benefit of a Korean patent application number 10-2021-0016532, filed on Feb. 5, 2021, in the Korean Intellectual Property Office, the disclosure of which is incorporated by reference herein in its entirety.

BACKGROUND

1. Field

The disclosure relates to an electronic device including a transparent display and a method of controlling the same.

DESCRIPTION OF RELATED ART

Various form factors are provided for electronic devices, for example, portable electronic devices, such as smartphones.

Next-generation electronic devices, such as transparent display devices have recently been under active study. A transparent display device refers to an electronic device with a transparent display having a transparent property, so that a background behind the electronic device is reflected as it is. A user may view necessary information on a screen of the transparent display device, while seeing a rear background behind the transparent display device. Therefore, the transparent display device may be used conveniently for various purposes in various environments because it may overcome the spatial and temporal limitations of existing electronic devices.

The above information is presented as background information only to assist with an understanding of the disclosure. No determination has been made, and no assertion is made, as to whether any of the above might be applicable as prior art with regard to the disclosure.

SUMMARY

A shortcoming with an electronic device including a transparent display lies in that a user exposes information requiring security to its rear surface unintentionally.

When the rear surface is overlaid with the same color and brightness as the information to overcome the shortcoming, the visibility of the information that the user needs to identify based on a transmissive property may also be decreased.

Aspects of the disclosure are to address at least the above-mentioned problems and/or disadvantages and to provide at least the advantages described below. Accordingly, an aspect of the disclosure is to provide an electronic device for preventing unintended disclosure of information by decreasing visibility on a rear surface thereof, while securing visibility on a front surface thereof, and a method of controlling the same.

Additional aspects will be set forth in part in the description which follows and, in part, will be apparent from the description, or may be learned by practice of the presented embodiments.

In accordance with an aspect of the disclosure, an electronic device is provided. The electronic device includes a transparent display capable of displaying content on front and rear parts thereof, and at least one processor operatively coupled to the transparent display. The at least one processor may be configured to identify a position and a size of content requiring security on a screen displayed on the front part, identify at least one of a color or a brightness of an object corresponding to the content, to be displayed on the rear part, and display the object having the identified color and brightness in an area of the rear part, determined based on the position and size of the content.

In accordance with another aspect of the disclosure, a method of controlling an electronic device is provided. The method includes identifying a position and a size of content requiring security on a screen displayed on a front part of a transparent display, identifying at least one of a color or a brightness of an object corresponding to the content, to be displayed on a rear part of the transparent display, and displaying the object having the identified color and brightness in an area of the rear part, determined based on the position and size of the content.

An electronic device according to various embodiments of the disclosure may protect information by decreasing visibility on a rear surface while securing visibility to a user.

Further, the electronic device according to various embodiments of the disclosure may reduce resource consumption of the electronic device used to identify the brightness of an object by identifying the same brightness as the brightness of the object in each divided range. When the brightness of content is changed in each divided range, the brightness of the object is maintained the same. Therefore, the resource consumption of the electronic device used to change the brightness of the object may be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
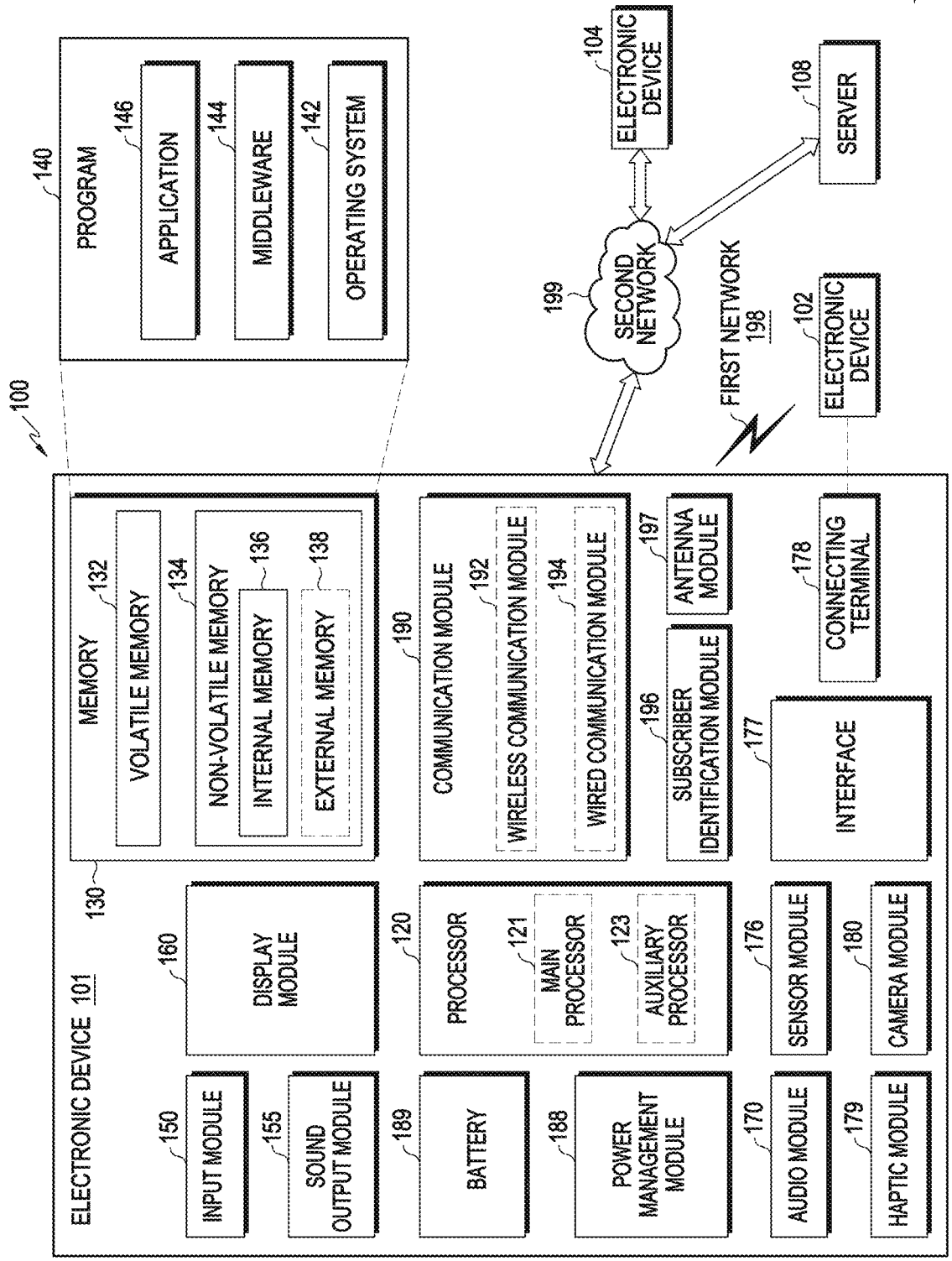
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on $5^{th}$ generation (5G) communication technology or IoT-related technology.

Figure 2A:
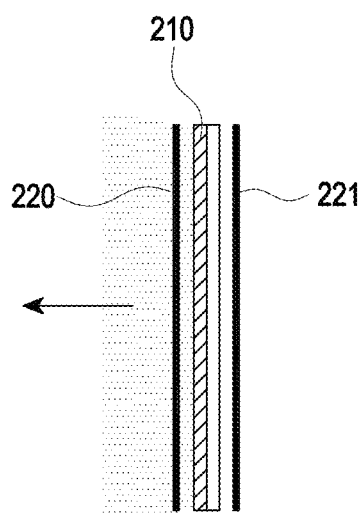
FIGS. 2A and 2B are simplified diagrams illustrating a structure of a single-sided or double-sided transparent display according to an embodiment of the disclosure.
Figure 2B:
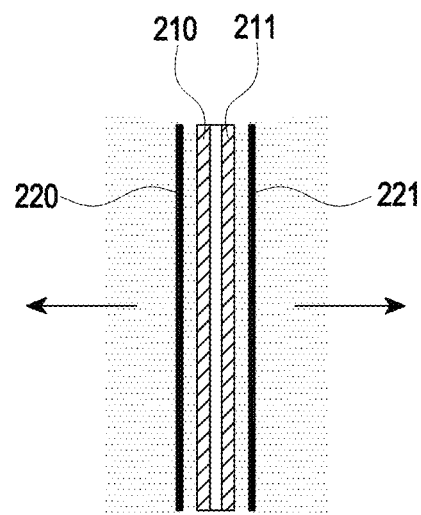

FIGS. 2A and 2B are simplified diagrams illustrating the structure of a single-sided or double-sided transparent display according to an embodiment of the disclosure. FIG. 2A is a simplified diagram illustrating the structure of a single-sided transparent display, and FIG. 2B is a simplified diagram illustrating the structure of a double-sided transparent display. Although the display is shown as wholly transparent in FIG. 2, only a part of the display may be transparent according to various embodiments.

Referring to FIG. 2A, a single-sided transparent display (e.g., the display module 160 of FIG. 1) of an electronic device (e.g., the electronic device 101 of FIG. 1) may include a transparent display panel 210 and a touch panel 220 covering the transparent display panel 210 on one surface (e.g., a front surface), and only a touch panel 221 without a display panel on the other surface (e.g., a rear surface). According to various embodiments of the disclosure, the touch panel 221 may also be omitted on the other surface.

According to various embodiments of the disclosure, the electronic device may display content through the transparent display panel 220 on the one surface, and a user may view the content displayed on the transparent display panel 210 through the other surface as well.

According to various embodiments of the disclosure, referring to FIG. 2B, a double-sided transparent display (e.g., the display module 160 of FIG. 1) of an electronic device (e.g., the electronic device 101 of FIG. 1) may include the transparent display panel 210 and the touch panel 220 covering the transparent display panel 210 on one surface (e.g., a front surface), and also a transparent display panel 211 and the touch panel 221 covering the transparent display panel 211 on the other surface (e.g., a rear surface). According to various embodiments of the disclosure, the touch panel 221 may be omitted on the other surface.

According to various embodiments of the disclosure, the electronic device may display different content through the transparent display panels 210 and 211 on both of the surfaces, and when display positions of the content overlap partially, different content may be displayed on both of the surfaces in a partially overlapped state.

Figure 3A:
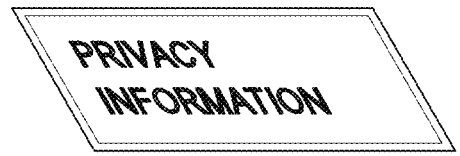
FIGS. 3A, 3B, and 3C are diagrams illustrating an electronic device before and after visual processing according to an embodiment of the disclosure.
Figure 3B:
Figure 3C:
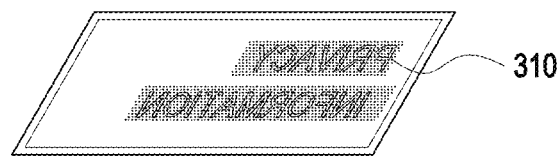

FIGS. 3A, 3B, and 3C are diagrams illustrating an electronic device before and after visual processing according to an embodiment of the disclosure.

Referring to FIGS. 3A, 3B, and 3C, FIG. 3A is a diagram illustrating a front part of a double-sided transparent display (e.g., the display module 160 of FIG. 1) before visual processing, and FIG. 3B is a diagram illustrating a rear part of the double-sided transparent display before visual processing. Accordingly, displayed content may be identified even on the rear surface, thereby exposing even content that the user does not want to disclose to others.

Accordingly, the electronic device (e.g., the electronic device 101 of FIG. 1) may perform visual processing to lower the visibility of the content on the rear surface, while securing the visibility of the content on the front surface, referring to FIG. 3C. For example, the visual processing may be displaying an object 310 in an area corresponding to the content on the rear part of the double-sided transparent display.

A visual processing operation for a double-sided transparent display according to various embodiments will be described below with reference to FIGS. 4, 5A, 5B, and 6 to 10.

Figure 4:
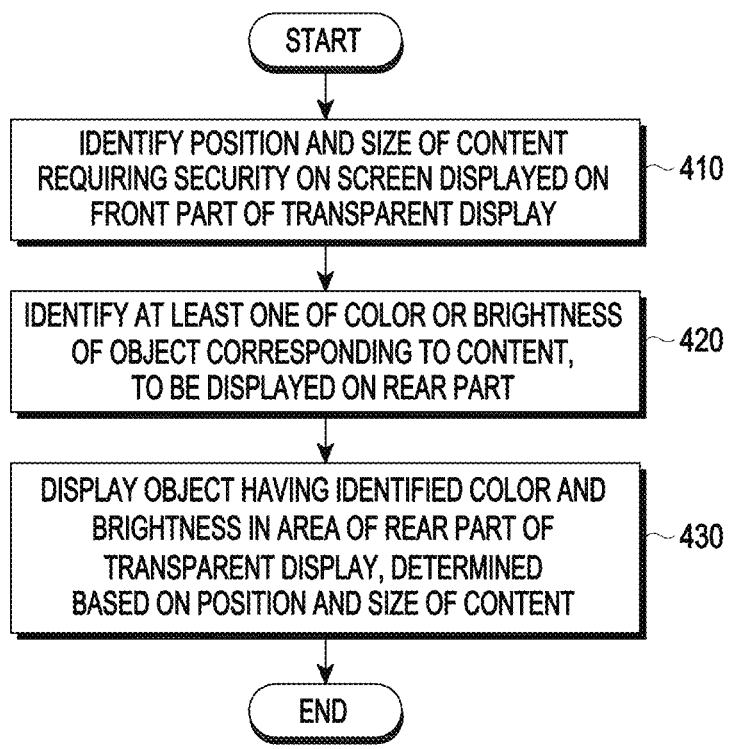
FIG. 4 is a diagram illustrating a visual processing operation based on content on a front part of a transparent display according to an embodiment of the disclosure.

FIG. 4 is a diagram illustrating a visual processing operation based on content on a front part of a transparent display according to an embodiment of the disclosure.

According to various embodiments of the disclosure, referring to FIG. 4, an electronic device (e.g., the electronic device 101 of FIG. 1 or the processor 120 of FIG. 1) may identify the position and size of content requiring security on a screen displayed on a front part of a transparent display (e.g., the display module 160 of FIG. 1) in operation 410. For example, the transparent display may be a double-sided transparent display capable of displaying content on front and rear parts thereof.

According to various embodiments of the disclosure, the electronic device may identify the content requiring security on a screen displayed on the front part. For example, the content requiring security may be content included in an execution screen of a specific function (e.g., application), as described in Table 1 below, or may be an area selected by the user.

TABLE 1

| Security required information security-required apps and information sensing user account-based information sensing | | user-selected security information information protection by directly selecting the area the user wants | |
|---|---|---|---|
| Apps | security element (example) | Apps | security element |
| Message | message content, recipient information | Social Network Service | images, conversations, postings, search contents, photos |
| Mail | mail receiving information, writing mail | videos | video being watched |
| Call | call log | | |
| Schedule | schedule content, time, place | | |
| Gallery | personal archival images and videos | | |
| Calendar | photos, videos | | |
| Memo | memo record, history | | |
| Cloud | server upload data | | |
| financial information | Financial information, amount, authentication code | | |
| Account, authentication | ID/Password, personal information, user authentication, pattern, biometric recognition | | |

According to various embodiments of the disclosure, when content requiring security is included on the front part of the transparent display, the electronic device may identify the position and size of the content requiring security. According to various embodiments of the disclosure, the electronic device may identify the shape (e.g., outline) or type (e.g., text, image, input button, or video) of the content requiring security.

According to various embodiments of the disclosure, in operation 420, the electronic device may identify at least one of the color or brightness of an object corresponding to the content. According to various embodiments of the disclosure, the object may be displayed on the rear part of the transparent display, for visual processing of the content.

For example, the electronic device may identify at least one of the color or brightness of the object corresponding to the content based on at least one of the color, brightness, or presence or absence of a background of the content displayed on the front part of the transparent display. For example, when the content does not include a background, the content may include only information (e.g., text), and when the content includes a background, the content may include the information and the background. According to various embodiments of the disclosure, the front part of the transparent display may display the content in the form of a plurality of layers, and when the content includes a background, the information of the content may be displayed on an upper layer, whereas the background of the content may be displayed on a lower layer.

According to various embodiments of the disclosure, when the content displayed on the front part of the transparent display does not include a background, the electronic device may identify a brightness different from that of the content, with a difference within a set range, as the brightness of the object based on at least one of the color or brightness of the content. According to various embodiments of the disclosure, the color of the object may be identified based on the color of the content. An operation of identifying the brightness of an object according to various embodiments will be described below with reference to FIGS. 5A and 5B.

According to various embodiments of the disclosure, when the content displayed on the front part of the transparent display includes a background, the electronic device may determine whether the difference in brightness between the information included in the content and the background is equal to or greater than a set value (e.g., 50%).

According to various embodiments of the disclosure, when the difference in brightness between the information and the background is equal to or greater than the set value, the electronic device may identify the brightness of the object to be displayed on the rear part of the transparent display based on the brightness of the information. According to various embodiments of the disclosure, the color of the object may be identified based on the color of the information.

For example, when the difference in brightness between the information and the background is equal to or greater than the set value, the electronic device may identify a brightness different from the brightness of the information, with a difference within a set range, as the brightness of the object.

According to various embodiments of the disclosure, when the difference in brightness between the information and the background is less than the set value, the electronic device may identify the brightness of the object to be displayed on the rear part of the transparent display based on the brightness of the background. According to various embodiments of the disclosure, the color of the object may be identified based on the color of the information.

For example, when the difference in brightness between the information and the background is less than the set value, the electronic device may identify a brightness different from the brightness of the background, with a difference within a set range, as the brightness of the object.

An operation of identifying the brightness of an object according to various embodiments will be described below with reference to FIGS. 5A, 5B, and 8.

According to various embodiments of the disclosure, when at least one of the color or brightness of the content is changed, the electronic device may change at least one of the color or brightness of the object based on at least one of the changed color or the changed brightness of the content.

According to various embodiments of the disclosure, when the type of the content is variable content, such as video, the electronic device may identify the color of the object as achromatic and determine the brightness of the object based on the brightness of the content. For example, when the type of content is video, the electronic device may obtain an average brightness for each set number of frames of the video and change the brightness of the object in real time based on the average brightness.

According to various embodiments of the disclosure, in operation 430, the electronic device may display the object having the identified color and brightness in an area of the rear part of the transparent display, determined based on the position and size of the content.

For example, when the content does not include a background, the electronic device may identify a corresponding area of the content on the rear part of the transparent display based on the position and size of the content, and determine an area including the corresponding area as an area of the object.

According to various embodiments of the disclosure, the area of the object may be determined in the form of a background including the corresponding area of the content regardless of the shape of the content, or may be determined as an area extended from the corresponding area of the content based on the shape of the content. The shape of an object according to various embodiments will be described below with reference to FIG. 7.

According to various embodiments of the disclosure, when the position of the content is changed, the electronic device may change the position of the object in real time to correspond to the changed position of the content.

Figure 5A:
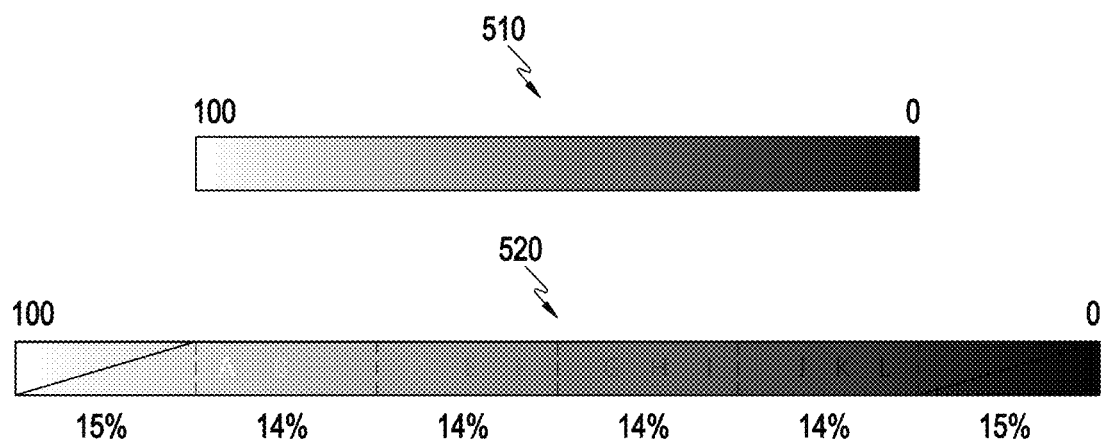
FIG. 5A is a diagram illustrating a visual processing operation using brightness of content according to an embodiment of the disclosure.

FIG. 5A is a diagram illustrating a visual processing operation using brightness of content according to an embodiment of the disclosure.

Figure 5B:
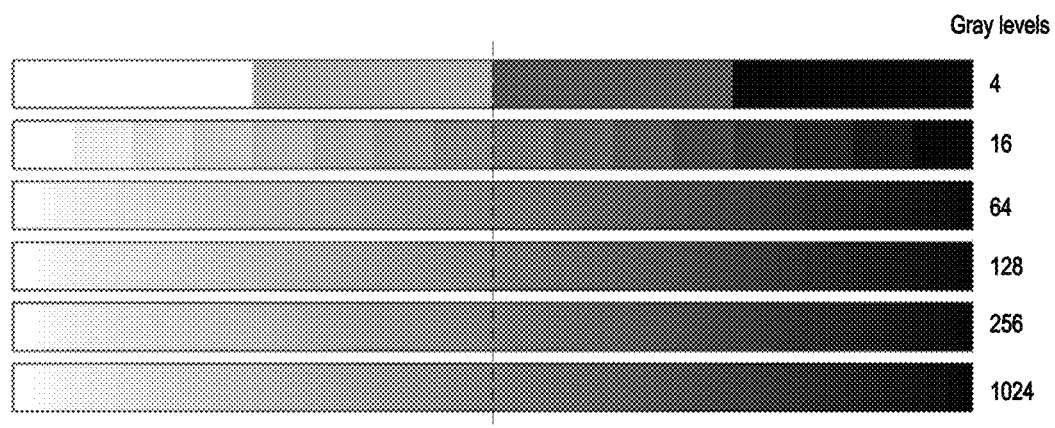
FIG. 5B is a diagram illustrating a visual processing operation using brightness of content according to an embodiment of the disclosure.

Referring to FIG. 5B, according to various embodiments of the disclosure, an electronic device (e.g., the electronic device 101 of FIG. 1 or the processor 120 of FIG. 1) may identify a brightness 520 of an object based on a brightness 510 of content. For example, when the brightness of the content and the brightness of the object are equal, visibility on the rear surface may be reduced. However, because the user may not identify the content, the electronic device may identify a brightness different from the brightness 510 of the content, with a difference within a set range, as the brightness 520 of the object in order to secure visibility for the user.

For example, the electronic device may map a remaining range (15 or more to less than 85) except for a brightest set range (e.g., in the case of 15%, 85 or more to 100) and a darkest set range (e.g., in the case of 15%, 0 to less than 15) to 100 to 0 of the brightness 510 of the content. For example, when the brightness of the content is 100, the electronic device may identify the brightness of the object as 85.

According to various embodiments of the disclosure, the sizes of the brightest and darkest ranges excluded from 100 to 0 of the brightness 520 of the object may be different from each other, and only the brightest or darkest range may be excluded.

According to various embodiments of the disclosure, although FIG. 5A illustrates an embodiment in which the remaining range except for a specific range in 100 to 0 of the brightness 520 of the object is mapped to 100 to 0 of the brightness 510 of the content, the brightness of the object may be identified by subtracting or adding a specific value from or to the brightness 510 of the content. For example, when the brightness of the content is in the range of 50 or more to 100, the brightness of the object may be identified as a value obtained by subtracting 10 from the brightness of the content, and when the brightness of the content is in the range of 0 to less than 50, the brightness of the object may be identified as a value obtained by adding 10 to the brightness of the content.

FIG. 5B is a diagram illustrating a visual processing operation using brightness of content according to an embodiment of the disclosure.

Referring to FIG. 5B, an electronic device (e.g., the electronic device 101 of FIG. 1 or the processor 120 of FIG. 1) may divide a remaining range except for a specific range in 100 to 0 of the brightness 520 of the object into a plurality of ranges, and identify the same brightness as the brightness of the object in each divided range. For example, when the electronic device divides the remaining range except for the brightest 15% range and the darkest 15% range in 100 to 0 of the brightness 520 of the object into four equal ranges, the same brightness may be identified as the brightness of the object in each of the four equal ranges. According to various embodiments of the disclosure, the remaining range except for a specific range in 100 to 0 of the brightness 520 of the object may be divided into 16, 64, 128, 256, or 1024 equal ranges.

As the same brightness is identified as the brightness of the object in each divided range in this manner, resource consumption of the electronic device used to identify the brightness of the object may be reduced, and when the brightness of the content is changed in each divided range, the brightness of the object remains the same, thereby reducing resource consumption of the electronic device used to change the brightness of the object.

Figure 6:
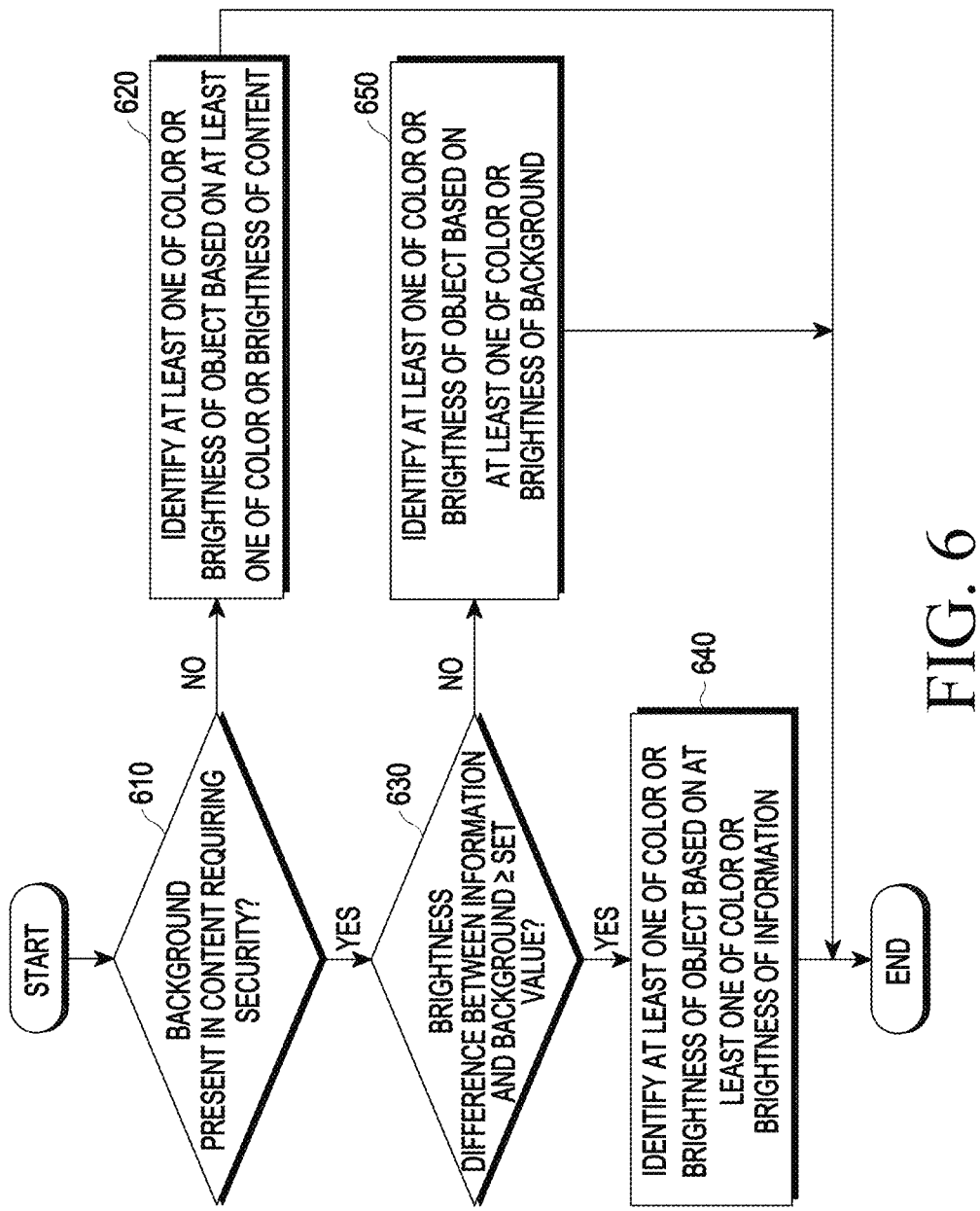
FIG. 6 is a diagram illustrating a visual processing operation based on a presence or absence of a background of content according to an embodiment of the disclosure.

FIG. 6 is a diagram illustrating a visual processing operation based on a presence or absence of a background in content according to an embodiment of the disclosure.

Referring to FIG. 6, in operation 610, an electronic device (e.g., the electronic device 101 of FIG. 1 or the processor 120 of FIG. 1) may identify the presence or absence of a background in content requiring security. For example, the content may be displayed on a front part of a double-sided transparent display (e.g., the display module 160 of FIG. 1).

According to various embodiments of the disclosure, when it is identified that the content requiring security has no background (operation 610—No), the electronic device may identify at least one of the color or brightness of an object based on at least one of the color or brightness of the content in operation 620. For example, the electronic device may identify the color of the content as the color of the object to be displayed on a rear part of the double-sided transparent display, and identify a brightness different from that of the content, with a difference within a set range, as the brightness of the object. The operation of identifying the brightness of an object has been described with reference to FIGS. 5A and 5B, and thus a redundant description will be avoided.

According to various embodiments of the disclosure, when it is identified that the content requiring security has a background (operation 610—Yes), the electronic device may determine whether the difference in brightness between information included in the content and the background is equal to or greater than a set value in operation 630. For example, the set value for the difference in brightness between the information included in the content and the background may be 50%.

According to various embodiments of the disclosure, when it is determined that the difference in brightness between the information and the background is equal to or greater than the set value (operation 630—Yes), the electronic device may identify at least one of the color or brightness of the object based on at least one of the color or brightness of the information in operation 640. For example, the electronic device may identify the color of the information included in the content as the color of the object to be displayed on the rear part of the double-sided transparent display, and identify a brightness different from that of the information included in the content, with a difference within a set range, as the brightness of the object. The operation of identifying the brightness of an object has been described with reference to FIGS. 5A and 5B, and thus a redundant description will be avoided.

According to various embodiments of the disclosure, when it is determined that the difference in brightness between the information and the background is less than the set value (operation 630—No), the electronic device may determine at least one of the color or brightness of the object based on at least one of the color or brightness of the background in operation 650. For example, the electronic device may identify the color of the background included in the content as the color of the object to be displayed on the rear part of the double-sided transparent display, and identify a brightness different from the brightness of the background included in the content, with a difference within a set range, as the brightness of the object. The operation of identifying the brightness of an object has been described with reference to FIGS. 5A and 5B, and thus a redundant description will be avoided.

As the brightness of the object is determined based on the brightness of the information or the background according to the difference in brightness between the information of the content and the background, visibility on the front surface is secured, while visibility on the rear surface is reduced.

Figure 7A:
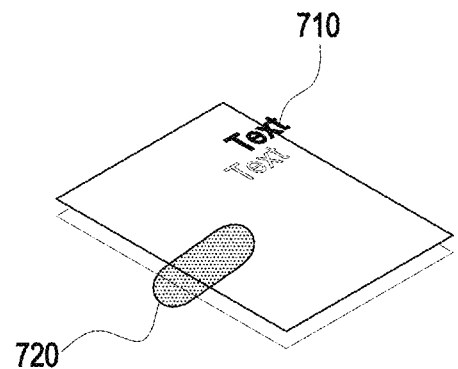
FIGS. 7A and 7B are diagrams illustrating a visual processing operation for a rear part of a double-sided display according to an embodiment of the disclosure.
Figure 7B:
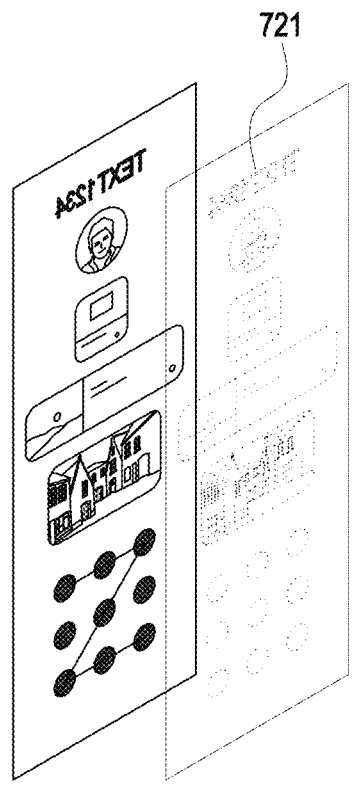

FIGS. 7A and 7B are diagrams illustrating a visual processing operation for a rear part of a double-sided display according to an embodiment of the disclosure. For example, FIG. 7A is a diagram illustrating a shape of an object unrelated to a shape of content, and FIG. 7B is a diagram illustrating a shape of an object based on a shape of content.

Referring to FIG. 7A, when there is no background in content 710 displayed on a front part of a double-sided transparent display (e.g., the display module 160 of FIG. 1), an electronic device (e.g., the electronic device 101 of FIG. 1 or the processor 120 of FIG. 1) may display an object 720 having a shape unrelated to the shape of the content on a rear part of the double-sided transparent display to conceal the morphological features of the content (e.g., text). For example, the electronic device may identify a corresponding area of the rear part corresponding to the content 710 displayed on the front part, and identify a figure (e.g., a rectangle, a rounded square with both semi-circular sides, or a square with four rounded corners) including the corresponding area as an area of the object.

However, the electronic device is not limited thereto, and as illustrated in FIG. 7B, the electronic device may identify a corresponding area of the rear part corresponding to the content displayed on the front part based on the shape of the content displayed on the front part of the double-sided transparent display, and identify an area extended from the corresponding area as an area 721 of the object. For example, the electronic device may identify an area extended from the outline of the content by a set length (or a set number of pixels) as the area 721 of the object.

While not shown in FIGS. 7A and 7B, according to various embodiments of the disclosure, when a background is included in the content, the electronic device may identify the area of the object based on the position and size of the background.

Figure 8:
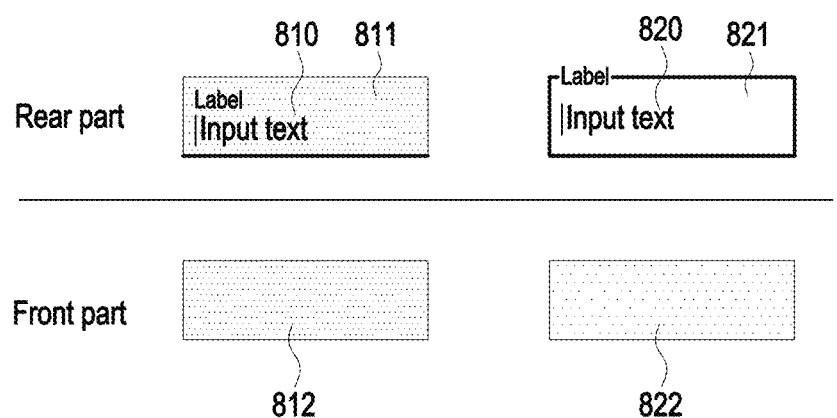
FIG. 8 is a diagram illustrating a visual processing operation for a rear part of a double-sided display according to an embodiment of the disclosure.

FIG. 8 is a diagram illustrating a visual processing operation for a rear part of a double-sided display according to an embodiment of the disclosure.

Referring to FIG. 8, in the case where a background is included in content displayed on a front part of a double-sided transparent display (e.g., the display module 160 of FIG. 1), when the difference in brightness between information 810 included in the content and a background 811 included in the content is less than a set value (e.g., 50%), an electronic device (e.g., the electronic device 101 of FIG. 1 or the processor 120 of FIG. 1) may identify a brightness 812 of an object to be displayed on a rear part based on the brightness of the background 811 included in the content in the manner illustrated in FIGS. 5A and 5B.

According to another embodiment of the disclosure, when the difference in brightness between the information 820 included in the content and a background 821 included in the content is equal to or greater than the set value (e.g., 50%), the electronic device may identify a brightness 822 of the object to be displayed on the rear part based on the brightness of the information 820 included in the content in the manner illustrated in FIGS. 5A and 5B.

Figure 9:
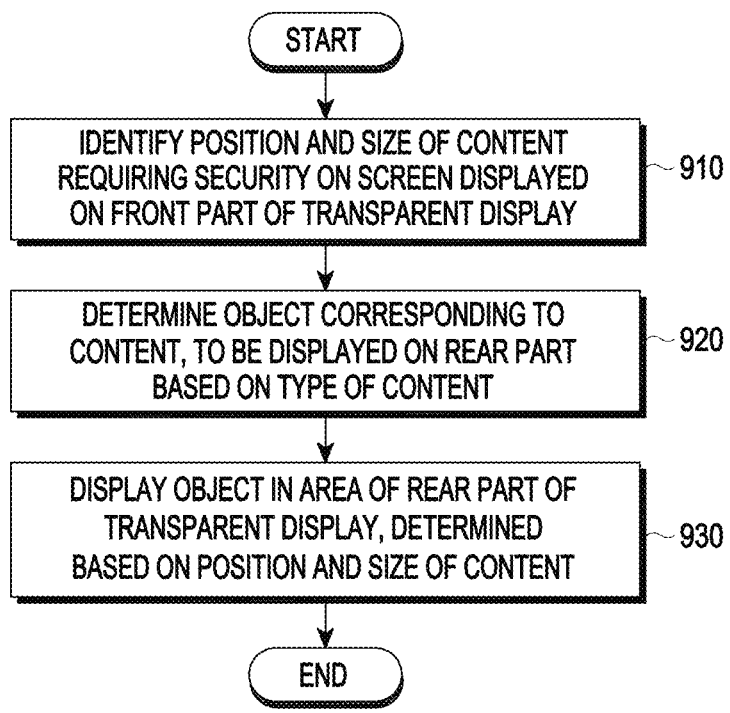
FIG. 9 is a diagram illustrating a visual processing operation based on a type of content on a front part of a transparent display according to an embodiment of the disclosure.

FIG. 9 is a diagram illustrating a visual processing operation based on a type of content on a front part of a transparent display according to an embodiment of the disclosure.

Referring to FIG. 9, an electronic device (e.g., the electronic device 101 of FIG. 1 or the processor 120 of FIG. 1) may identify the position and size of content requiring security on a screen displayed on a front part of a transparent display in operation 910. For example, the transparent display may be a double-sided transparent display capable of displaying content on front and rear parts thereof. An operation of identifying the position and size of content requiring security on a screen displayed on the front part of the transparent display is identical to operation 410 of FIG. 4, and thus a redundant description will be avoided.

According to various embodiments of the disclosure, the electronic device may further perform an operation of identifying the type of the content requiring security, and determine an object corresponding to the content based on the type of the content in operation 920.

For example, when the type of the content is variable content, the electronic device may identify the color of the object as achromatic and determine the brightness of the object based on the brightness of the content.

For example, when the type of the content is video, the electronic device may obtain an average brightness for each set number of frames of the video and change the brightness of the object in real time based on the average brightness.

In another embodiment of the disclosure, when the type of the content is an input button, and the content changes according to a touch on the button, the electronic device may identify the color of the object as achromatic and determine the brightness of the object based on the brightness of the content.

Figure 10:
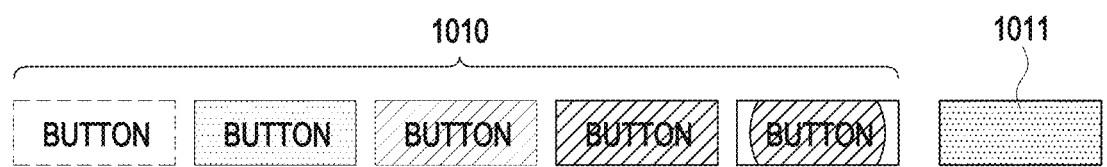
FIG. 10 is a diagram illustrating a visual processing operation corresponding to content having a state change according to an embodiment of the disclosure.

FIG. 10 is a diagram illustrating a visual processing operation corresponding to content having a state change according to an embodiment of the disclosure.

Referring to FIG. 10, when content displayed on the front part of the transparent display is an input button 1010 in a state varying according to a touch, an electronic device (e.g., the electronic device 101 of FIG. 1 or the processor 120 of FIG. 1) may determine the color of an object 1011 corresponding to the content as achromatic. According to various embodiments of the disclosure, when the input button 1010 does not have a background, the electronic device may identify the brightness of the object 1011 based on the brightness of text of the input button 1010. In another embodiment of the disclosure, when the input button 1010 has a background, the electronic device may determine the brightness of the object 1011 based on the difference in brightness between the text of the input button 1010 and the background. Since the operation of determining the brightness of the object 1011 based on the difference in brightness between the text and the background has been described with reference to FIGS. 6 and 8, a redundant description will be avoided.

According to various embodiments of the disclosure, in operation 930, the electronic device may display the object in an area of the rear part of the transparent display, determined based on the position and size of the content.

According to various embodiments of the disclosure, as described in Table 2, the electronic device may perform visual processing to reduce the visibility of the rear surface based on the type of content and the characteristics of each type.

TABLE 2

| Information type | Characteristics by type | | Precautions on security processing |
|---|---|---|---|
| Text (numbers, Korean/English) | In the case of phone numbers of calls, the characteristic forms of characters should be concealed. | Shape | 1. Method of decreasing visibility of morphological features e.g., A characteristic shape is concealed by increasing an outline stroke value. 2. A background is formed by processing a container box in a surrounding part. 3. Image distortion |
| | | color | When the rear surface is concealed in the same color as the front surface, the visibility of the front surface may be significantly decreased according to projection features. A brightness value different from that of a font color on the front surface needs adjustment. |
| Shape | Most of components, such as a thumbnail | Shape | When surrounded by a structure, distorted based on the |

TABLE 2-continued

| Information type | Characteristics by type | | Precautions on security processing |
|---|---|---|---|
| | image, a list, a card type, and so on exist within a basic shape. | Color | outermost outline of a basic figure background. The color of the hindmost background is equally applied. |
| Image | Information inside an image is protected. | Shape | The entire image is distorted so that it cannot be figured out on the rear surface. |
| | | Color | All of various colors need covering. A grayscale tone or various colors may be used. |
| Video | Image information changing in real time is protected. | Shape | Distortion is needed in consideration of real-time changes because information of internal content varies in real time. |
| | | Color | When the rear surface is concealed in the same color as the front surface, the visibility of the front surface may be significantly decreased according to projection features. A brightness value different from that of a font color on the front surface needs adjustment according to real-time change on the front surface. |
| Pattern, free drawing | Private archival images. | Shape | 1. Method of decreasing visibility of morphological features e.g., A characteristic shape is concealed by increasing an outline stroke value. 2. A background is formed by processing a container box in a surrounding part. 3. Image distortion |
| | | color | When the rear surface is concealed in the same color as the front surface, the visibility of the front surface may be significantly decreased according to projection features. A brightness value different from that of a font color on the front surface needs adjustment. |

Figure 11:
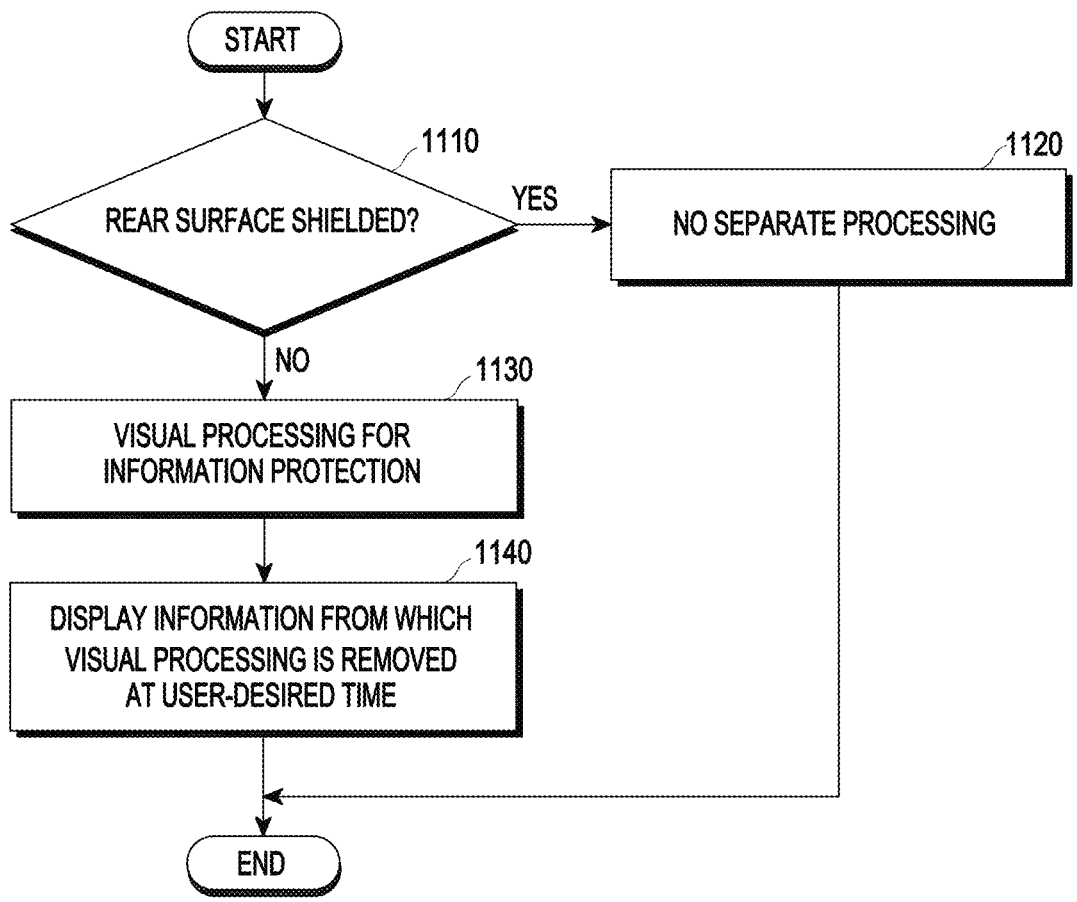
FIG. 11 is a diagram illustrating a visual processing operation depending on whether a rear surface of a double-sided or single-sided transparent display is shielded according to an embodiment of the disclosure.

FIG. 11 is a diagram illustrating a visual processing operation depending on whether a rear surface of a single-sided transparent display is shielded according to an embodiment of the disclosure.

Referring to FIG. 11, according to various embodiments of the disclosure, when content requiring security is displayed, and the transparent display is a double-sided transparent display, the electronic device may display information on a front part of the double-sided transparent display, and perform visual processing on a rear part thereof, for information protection, as described with reference to FIGS. 4, 5A, 5B, and 6 to 10. According to various embodiments of the disclosure, when content requiring security is displayed, and the transparent display is a single-sided transparent display, the electronic device may perform visual processing in the following method, because it is impossible to perform visual processing using a rear part in the case of a single-sided transparent display.

According to various embodiments of the disclosure, an electronic device (e.g., the electronic device 101 of FIG. 1 or the processor 120 of FIG. 1) may identify whether the rear surface thereof is shielded in operation 1110. For example, when content requiring security is displayed, the electronic device may identify whether the rear surface of a transparent display (e.g., the display module 160 of FIG. 1) (e.g., an IR sensor, an ultrasonic sensor, a touch sensor, a proximity sensor, an illuminance sensor, or a grip sensor) is shielded, using a camera (e.g., the camera module of FIG. 1) or a sensor (e.g., the sensor module 176 of FIG. 1).

According to various embodiments of the disclosure, when the distance between an object (e.g., a hand or a desk) shielding the rear surface of the transparent display and the transparent display is less than a set value, the electronic device may identify that the rear surface of the transparent display is shielded. In another embodiment of the disclosure, in the case where the electronic device is a foldable display device foldable through a hinge, and a first display is a transparent display and a second display is not a transparent display, with respect to the hinge, when the second display is in an out-folded state in which the second display is disposed on the rear surface of the first display, the electronic device may identify that the rear surface of the transparent display is shielded.

According to various embodiments of the disclosure, when identifying that the rear surface of the transparent display is shielded (operation 1110—Yes), the electronic device may display content without additional processing in operation 1120. For example, when at least a part of the rear surface of the transparent display is identified as being shielded, the electronic device may display the content in an area identified as shielded without additional processing.

Figure 12A:
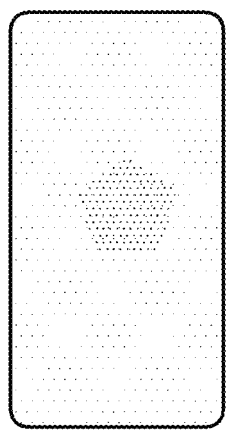
FIGS. 12A and 12B are diagrams illustrating a visual processing operation depending on whether a rear surface of a single-sided transparent display is shielded according to an embodiment of the disclosure.
Figure 12B:
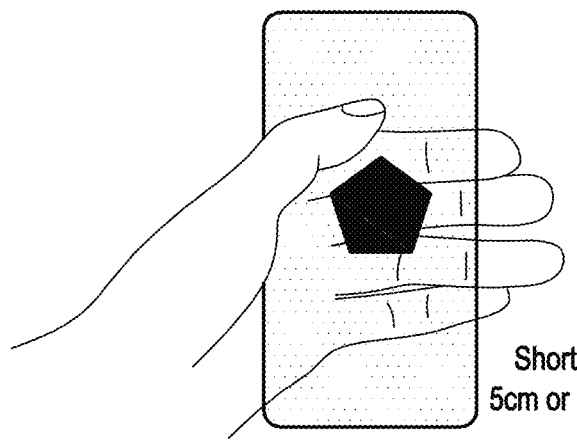

FIGS. 12A and 12B are diagrams illustrating an electronic device including a single-sided transparent display before and after visual processing according to an embodiment of the disclosure.

Referring to FIGS. 12A and 12B, they illustrate content viewed from the rear surface of the transparent display before visual processing.

According to various embodiments of the disclosure, when identifying that the rear surface of the transparent display is not shielded (operation 1110—No), the electronic device may perform visual processing for information protection in operation 1130.

For example, the visual processing may include at least one of blur processing that distorts a shape by lowering the visibility of the outline of content including information requiring security, distortion processing for entire content, processing for reducing the transparency of a content area, opacity processing for a content area, overlay processing that blurs an image by overlapping transparent objects with each other in a content area, pattern processing that blurs an image by overlapping patterns with each other, or gradient processing that blurs an image by mixing multiple colors.

According to various embodiments of the disclosure, in operation 1140, the electronic device may display information from which the visual processing has been removed at a user-desired time.

For example, the electronic device may display the information from which the visual processing has been removed based on a user input. In another embodiment of the disclosure, when the content on which the visual processing has been performed is displayed and then the rear surface of the transparent display is shielded, the electronic device may display the information from which the visual processing has been removed.

While operation 1110 of identifying whether the rear surface is shielded is illustrated in FIG. 11, the electronic device may display the content requiring security after performing the visual processing before operation 1110 of identifying whether the rear surface is shielded according to various embodiments. For example, after displaying the content on which the visual processing has been performed, the electronic device may identify whether the rear surface is shielded or display the content from which the visual processing has been removed based on a user input.

FIGS. 12A and 12B are diagrams illustrating a visual processing operation depending on whether a rear surface of a single-sided transparent display is shielded according to an embodiment of the disclosure.

According to various embodiments of the disclosure, an electronic device (e.g., the electronic device 101 of FIG. 1 or the processor 120 of FIG. 1) may identify that the rear surface of a transparent display (e.g., the display of FIG. 1) is not shielded or display content visually processed by default before the identification, as illustrated in FIG. 12A.

According to various embodiments of the disclosure, the electronic device may identify that the rear surface of the entire area of the visually processed content of the transparent display is shielded (e.g., an object is detected at a short distance of 5 cm or less from the rear surface) or display the content from all of which the visual processing has been removed, as illustrated in FIG. 12B.

Figure 13A:
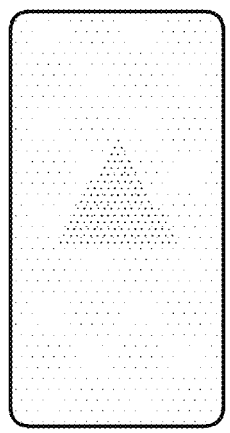
FIGS. 13A and 13B are diagrams illustrating a visual processing operation depending on whether a rear surface of a single-sided transparent display is shielded according to an embodiment of the disclosure.
Figure 13B:
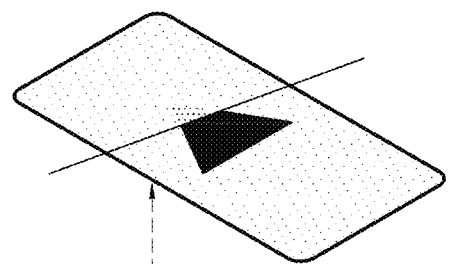

FIGS. 13A and 13B are diagrams illustrating a visual processing operation depending on whether a rear surface of a single-sided transparent display is shielded according to an embodiment of the disclosure.

Referring to FIGS. 13A and 13B, according to various embodiments of the disclosure, an electronic device (e.g., the electronic device 101 of FIG. 1 or the processor 120 of FIG. 1) may identify that the rear surface of a transparent display (e.g., the display module 160 of FIG. 1) is not shielded or display content visually processed by default before the identification, as illustrated in FIG. 13A.

According to various embodiments of the disclosure, the electronic device may identify that the rear surface of a partial area of the visually processed content of the transparent display is shielded (e.g., an object is detected at a short distance of 5 cm or less from the rear surface) or display the content from a part of which the visual processing has been removed, as illustrated in FIG. 13B.

Figure 14:
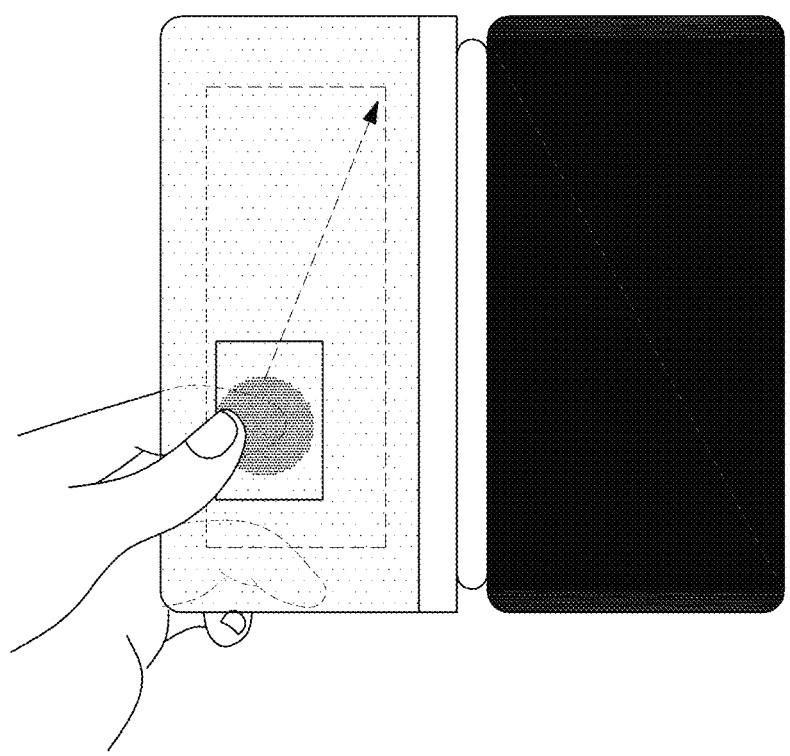
FIG. 14 is a diagram illustrating a change in a size of a visual processing area based on a user manipulation according to an embodiment of the disclosure.

FIG. 14 is a diagram illustrating a change in a size of a visual processing area according to a user manipulation according to an embodiment of the disclosure.

Referring to FIG. 14, upon input of a long press in an area of a transparent display (e.g., the display module 160 of FIG. 1), an electronic device (e.g., the electronic device 101 of FIG. 1 or the processor 120 of FIG. 1) may extend a visual processing area or a visual processing removal area from the area where the long press is input in proportion to a holding time of the long press. For example, when the content is displayed in a visually processed state, the visual processing removal area of the content may be extended based on the long press input area and the holding time. In another embodiment of the disclosure, when the content is displayed without separate processing, the visual processing area of the content may be extended based on the long press input area and the holding time.

According to various embodiments of the disclosure, the long press may be performed by a single-sided or double-sided touch, and when a drag is input along with the long press input, the visual processing area or the visual processing removal area may be extended in a drag direction.

Figure 15:
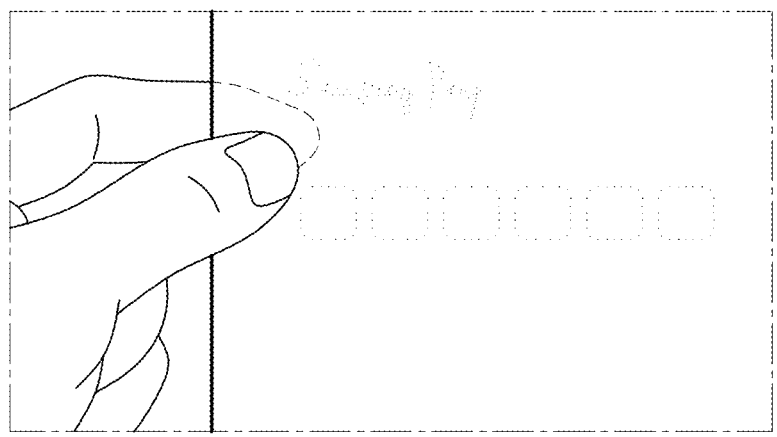
FIG. 15 is a diagram illustrating control of a visual processing operation through touches on both surfaces of a transparent display according to an embodiment of the disclosure.

FIG. 15 is a diagram illustrating control of a visual processing operation through a double-sided touch on a transparent display according to an embodiment of the disclosure.

Referring to FIG. 15, according to various embodiment of the disclosure s, upon input of a long press on both surfaces of a transparent display (e.g., the display module 160 of FIG. 1), an electronic device (e.g., the electronic device 101 of FIG. 1 or the processor 120 of FIG. 1) may visually process content requiring security or remove visual processing from the content. For example, when the content is displayed in a visually processed state, the electronic device may display the content after removing the visual processing based on the long press input. In another embodiment of the disclosure, when the content is displayed without separate processing, the content may be visually processed and displayed based on the long press input.

According to various embodiments of the disclosure, an electronic device (e.g., the electronic device 101 of FIG. 1) may include a transparent display (e.g., the display module 160 of FIG. 1) capable of displaying content on front and rear parts thereof, and at least one processor (e.g., the processor 120 of FIG. 1) operatively coupled to the transparent display. The at least one processor may be configured to identify a position and a size of content requiring security on a screen displayed on the front part, identify at least one of a color or a brightness of an object corresponding to the content, to be displayed on the rear part, and display the object having the identified color and brightness in an area of the rear part, determined based on the position and size of the content.

According to various embodiments of the disclosure, the at least one processor (e.g., the processor 120 of FIG. 1) may identify at least one of the color or the brightness of the object corresponding to the content based on at least one of a color, a brightness, or presence or absence of a background of the content.

According to various embodiments of the disclosure, when the content does not include a background, the at least one processor (e.g., the processor 120 of FIG. 1) may identify a brightness different from the brightness of the content, with a difference within a set range, as the brightness of the object.

According to various embodiments of the disclosure, when the content includes a background, the at least one processor (e.g., the processor 120 of FIG. 1) may determine whether a difference between a brightness of information other than the background and a brightness of the background is equal to or greater than a set value, and when the difference between the brightness of the information and the brightness of the background is equal to or greater than the set value, identify a brightness different from the brightness of the information, with a difference within a set range, as the brightness of the object.

According to various embodiments of the disclosure, when the content includes a background, the at least one processor (e.g., the processor 120 of FIG. 1) may determine whether a difference between a brightness of information other than the background and a brightness of the background is equal to or greater than a set value, and when the difference between the brightness of the information and the brightness of the background is less than the set value, identify a brightness different from the brightness of the background, with a difference within a set range, as the brightness of the object.

According to various embodiments of the disclosure, when at least one of a color or a brightness of the content is changed, the at least one processor (e.g., the processor 120 of FIG. 1) may change at least one of the color or the brightness of the object in real time based on the changed at least one of the color or the brightness of the content.

According to various embodiments of the disclosure, when a type of the content is video, the at least one processor (e.g., the processor 120 of FIG. 1) may determine the color of the object as an achromatic color, and change the brightness of the object in real time in each frame of the video.

According to various embodiments of the disclosure, the at least one processor (e.g., the processor 120 of FIG. 1) may identify a corresponding area of the content on the rear part based on the position and the size of the content, and determine an area including the corresponding area as an area of the object.

According to various embodiments of the disclosure, the at least one processor (e.g., the processor 120 of FIG. 1) may identify the corresponding area of the content on the rear part by further considering a shape of the content, and determine an area extended from the corresponding area as the area of the object based on a shape of the corresponding area.

According to various embodiments of the disclosure, the front part of the transparent display (e.g., the display module 160 of FIG. 1) may include a first transparent display panel (e.g., the transparent display panel 210 of FIG. 2) and a first touch panel (e.g., the touch panel 220 of FIG. 2) covering the first transparent display panel, and the rear part of the transparent display may include a second transparent display panel (e.g., the transparent display panel 211 of FIG. 2) and a second touch panel (e.g., the touch panel 221 of FIG. 2) covering the second transparent display panel.

According to various embodiments of the disclosure, a method of controlling an electronic device (e.g., the electronic device 101 of FIG. 1 or the processor 120 of FIG. 1) may include identifying a position and a size of content requiring security on a screen displayed on a front part of a transparent display (e.g., the display module 160 of FIG. 1), identifying at least one of a color or a brightness of an object corresponding to the content, to be displayed on a rear part of the transparent display, and displaying the object having the identified color and brightness in an area of the rear part, determined based on the position and size of the content.

According to various embodiments of the disclosure, identifying the at least one of the color or the brightness of the object may include identifying at least one of the color or the brightness of the object corresponding to the content based on at least one of a color, a brightness, or presence or absence of a background of the content.

According to various embodiments of the disclosure, identifying the at least one of the color or the brightness of the object may include, when the content does not include a background, identifying a brightness different from the brightness of the content, with a difference within a set range, as the brightness of the object.

According to various embodiments of the disclosure, identifying the at least one of the color or the brightness of the object may include, when the content includes a background, determining whether a difference between a brightness of information other than the background and a brightness of the background is equal to or greater than a set value, and when the difference between the brightness of the information and the brightness of the background is equal to or greater than the set value, identifying a brightness different from the brightness of the information, with a difference within a set range, as the brightness of the object.

According to various embodiments of the disclosure, identifying the at least one of the color or the brightness of the object may include, when the content includes a background, determining whether a difference between a brightness of information other than the background and a brightness of the background is equal to or greater than a set value, and when the difference between the brightness of the information and the brightness of the background is less than the set value, identifying a brightness different from the brightness of the background, with a difference within a set range, as the brightness of the object.

According to various embodiments of the disclosure, the method may further include, when at least one of a color or a brightness of the content is changed, changing at least one of the color or the brightness of the object in real time based on the changed at least one of the color or the brightness of the content.

According to various embodiments of the disclosure, identifying the at least one of the color or the brightness of the object may further include, when a type of the content is video, determining the color of the object as an achromatic color, and changing the brightness of the object in real time in each frame of the video.

According to various embodiments of the disclosure, the method may further include identifying a corresponding area of the content on the rear part based on the position and the size of the content, and determining an area including the corresponding area as an area of the object.

According to various embodiments of the disclosure, identifying the corresponding area of the content may include identifying the corresponding area of the content on the rear part by further considering a shape of the content, and determining the area including the corresponding area as the area of the object may include determining an area extended from the corresponding area as the area of the object based on a shape of the corresponding area.

According to various embodiments of the disclosure, the method may further include, when the position of the content is changed, changing the position of the object in real time to correspond to the changed position of the content.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device comprising:
   a transparent display configured to display content on a front part and a rear part of the transparent display;
   at least one processor comprising processing circuitry; and
   memory storing instructions that, when executed by the at least one processor individually or collectively, cause the electronic device to:
   identify a position and a size of content requiring security on a screen displayed on the front part,
   identify at least one of a color or a brightness of an object corresponding to the content, to be displayed on the rear part, and display, through the transparent display, the object having the identified color and brightness, in an area of the rear part determined based on the position and size of the content.

2. The electronic device of claim 1, wherein the instructions, when executed by the at least one processor individually or collectively, further cause the electronic device to; identify at least one of the color or the brightness of the object corresponding to the content based on at least one of a color, a brightness, or presence or absence of a background, of the content.

3. The electronic device of claim 2, wherein the instructions, when executed by the at least one processor individually or collectively, further cause the electronic device to: based on the content not including a background, identify a brightness different from the brightness of the content, with a difference within a set range, as the brightness of the object.

4. The electronic device of claim 2, wherein the instructions, when executed by the at least one processor individually or collectively, further cause the electronic device to: based on the content including a background, determine whether a difference between a brightness of information other than the background and a brightness of the background is equal to or greater than a set value, and based on the difference between the brightness of the information and the brightness of the background being equal to or greater than the set value, identify a brightness different from the brightness of the information, with a difference within a set range, as the brightness of the object.

5. The electronic device of claim 2, wherein the instructions, when executed by the at least one processor individually or collectively, further cause the electronic device to: based on the content including a background, determine whether a difference between a brightness of information other than the background and a brightness of the background is equal to or greater than a set value, and based on the difference between the brightness of the information and the brightness of the background being less than the set value, identify a brightness different from the brightness of the background, with a difference within a set range, as the brightness of the object.

6. The electronic device of claim 1, wherein the instructions, when executed by the at least one processor individually or collectively, further cause the electronic device to: based on at least one of a color or a brightness of the content being changed, change at least one of the color or the brightness of the object in real time based on the changed at least one of the color or the brightness of the content.

7. The electronic device of claim 1, wherein the instructions, when executed by the at least one processor individually or collectively, further cause the electronic device to: based on a type of the content being a video, determine the color of the object as an achromatic color, and change the brightness of the object in real time in each frame of the video.

8. The electronic device of claim 1, wherein the instructions, when executed by the at least one processor individually or collectively, further cause the electronic device to: identify a corresponding area of the content on the rear part based on the position and the size of the content, and determine an area including the corresponding area as an area of the object.

9. The electronic device of claim 8, wherein the instructions, when executed by the at least one processor individually or collectively, further cause the electronic device to: identify the corresponding area of the content on the rear part by further considering a shape of the content, and determine an area extended from the corresponding area as the area of the object based on a shape of the corresponding area.

10. The electronic device of claim 1, wherein the front part of the transparent display includes a first transparent display panel and a first touch panel covering the first transparent display panel, and wherein the rear part of the transparent display includes a second transparent display panel and a second touch panel covering the second transparent display panel.

11. A method of controlling an electronic device, the method comprising:
identifying a position and a size of content requiring security on a screen displayed on a front part of a transparent display of the electronic device;
identifying at least one of a color or a brightness of an object corresponding to the content, to be displayed on a rear part of the transparent display; and
displaying, through the transparent display, the object having the identified color and brightness in an area of the rear part, determined based on the position and size of the content.

12. The method of claim 11, wherein the identifying of the at least one of the color or the brightness of the object comprises identifying at least one of the color or the brightness of the object corresponding to the content based on at least one of a color, a brightness, or presence or absence of a background, of the content.

13. The method of claim 12, wherein the identifying of the at least one of the color or the brightness of the object comprises, based on the content not including a background, identifying a brightness different from the brightness of the content, with a difference within a set range, as the brightness of the object.

14. The method of claim 12, wherein the identifying of the at least one of the color or the brightness of the object comprises:
based on the content including a background, determining whether a difference between a brightness of information other than the background and a brightness of the background is equal to or greater than a set value, and
based on the difference between the brightness of the information and the brightness of the background being equal to or greater than the set value, identifying a brightness different from the brightness of the information, with a difference within a set range, as the brightness of the object.

15. The method of claim 12, wherein the identifying of the at least one of the color or the brightness of the object comprises:
based on the content including a background, determining whether a difference between a brightness of information other than the background and a brightness of the background is equal to or greater than a set value, and
based on the difference between the brightness of the information and the brightness of the background being less than the set value, identifying a brightness different from the brightness of the background, with a difference within a set range, as the brightness of the object.

16. The method of claim 11, further comprising:
based on at least one of a color or a brightness of the content being changed, changing at least one of the color or the brightness of the object in real time based on the changed at least one of the color or the brightness of the content.

17. The method of claim 11, wherein the identifying of the at least one of the color or the brightness of the object comprises:
   based on a type of the content being a video, determining the color of the object as an achromatic color, and
   changing the brightness of the object in real time in each frame of the video.

18. The method of claim 11, further comprising:
   identifying a corresponding area of the content on the rear part based on the position and the size of the content, and
   determining an area including the corresponding area as an area of the object.

19. The method of claim 18, wherein the identifying the corresponding area of the content comprises:
   identifying the corresponding area of the content on the rear part by further considering a shape of the content, and
   wherein the determining the area including the corresponding area as the area of the object comprises:
   determining an area extended from the corresponding area as the area of the object based on a shape of the corresponding area.

20. The method of claim 11, further comprising:
   based on the position of the content being changed, changing the position of the object corresponding to the changed position of the content in real time.

* * * * *